Patented July 31, 1951

2,562,863

UNITED STATES PATENT OFFICE 2,562,863

METHODS OF PREPARING MONOCHLOROACETYLUREAS

Erick I. Hoegberg, Stamford, Conn., assignor to American Cyanamid Company, New York, N. Y., a corporation of Maine No Drawing. Application May 25, 1949,
Serial No. 95,381

7 Claims. (Cl. 260—553)

The present invention relates to the production of chloroacetylurea compounds. More particularly, it relates to methods of preparing monochloroacetylureas of the general formula

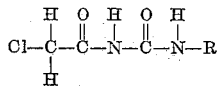

in which R represents a member of the group consisting of hydrogen, alkyl, and aryl radicals, such as, for example, monochloroacetylurea, 1-monochloroacetyl-3-methylurea, 1 - monochloroacetyl - 3 - ethylurea, 1-monochloroacetyl-3-isopropylurea, 1-monochloroacetyl-3-allylurea, 1-monochloroacetyl-3-n-butylurea, 1-monochloroacetyl-3-n-amylurea, 1 - monochloroacetyl-3-(2-ethylhexyl)urea, 1-monochloroacetyl - 3 - cyclohexylurea, 1-monochloroacetyl-3-n-octylurea, 1-monochloroacetyl - 3 - decylurea, 1-monochloroacetyl-3-dodecylurea, 1-monochloroacetyl-3-tetradecylurea, 1-monochloroacetyl - 3 - octadecylurea, 1-monochloroacetyl-3-phenylurea, and 1-monochloroacetyl-3-(1-naphthyl)urea.

It has been discovered that a chloroacetylurea of the above type may be readily prepared by reacting together a urea of the formula

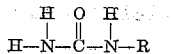

in which R has the meaning shown above, thionyl chloride, and a member of the group consisting of monochloroacetic acid and an alkali metal salt of monochloroacetic acid.

A typical reaction in which monochloroacetic acid, thionyl chloride, and methylurea are reacted together to produce 1-monochloroacetyl-3-methylurea may be illustrated as follows:

The reaction is preferably carried out at a temperature within the range of from about 30° C. to 150° C. However, temperatures outside this range may be employed depending upon the type of reactants utilized. Cooling means may be necessary, inasmuch as the reaction is somewhat exothermic, particularly in the early stages.

Diluents which are inert to the reactants and to the final product are useful in the process to prevent local overheating of the reaction mixture, and to provide the product as a slurry rather than a solid mass, thus making it easier to filter and wash. Such inert materials include toluene, benzene, xylene, hexane, heptane, chlorobenzene, carbon tetrachloride, ethylene dichloride, and the like.

The invention is further illustrated by the following examples in which the parts are by weight.

*Example 1*

94.5 parts of monochloroacetic acid, 119 parts of thionyl chloride, and 60 parts of urea were mixed together, thus providing a clear solution which was stirred and heated under reflux at a temperature of 75°–80° C. The reaction mixture solidified after heating for 2½ hours. The solid product was cooled to 20° C., pulverized, washed with cold water, and dried at 65° C. 102 parts of monochloroacetylurea were obtained, M. P. 182°–185° C.

*Example 2*

A well-agitated mixture consisting of 80 parts of monochloroacetic acid, 101 parts of thionyl chloride, 50 parts of urea, and 86 parts of toluene were heated under reflux over a period of two hours. The maximum temperature reached during the heating period was 106° C. The mixture was cooled to room temperature and filtered. The filter cake was washed with ice water and then dried at 65° C., giving 102 parts (89% yield) of monochloroacetylurea.

*Example 3*

The procedure of Example 2 was employed using 94.5 parts of monochloroacetic acid, 119 parts of thionyl chloride, 60 parts of urea, and 225 parts of carbon tetrachloride. The mixture was heated under reflux for 3½ hours. 100 parts of monochloroacetylurea were obtained.

*Example 4*

The procedure of Example 2 was employed using 18.9 parts of monochloroacetic acid, 23.8 parts of thionyl chloride, 27.2 parts of phenylurea and 65 parts of toluene. 34 parts (80% yield) of 1-monochloroacetyl-3-phenylurea were obtained. The product was a tan-colored crystalline material melting at 149°–153° C.

Example 5

The procedure of Example 2 was employed using 28.4 parts of monochloroacetic acid, 35.7 parts of thionyl chloride, 22.2 parts of methylurea, and 86 parts of toluene. 35 parts (78% yield) of 1-monochloroacetyl-3-methylurea were obtained. The product was a colorless crystalline material melting at 205°–207° C.

Example 6

119 parts of thionyl chloride were gradually added during a period of one hour to a mixture consisting of 60 parts of urea, 126.5 parts of sodium monochloroacetate and 215 parts of toluene. The temperature of the mixture gradually rose to 50° C. during the thionyl chloride addition. The reaction mixture was warmed on a steam bath for two hours, and then cooled to about 10° C. in an ice bath. 50 parts of cold water were added, followed by 10% sodium hydroxide solution until the mixture was neutral. The resulting slurry of monochloroacetylurea was filtered. The filter cake was washed with cold water, and dried at 65° C. 76 parts of monochloroacetylurea were obtained.

The chloroacetylurea compounds, prepared by the methods of the present invention, are adapted for various uses, more particularly as intermediates in the production of insecticides, fungicides, rodenticides, plasticizers, corrosion inhibitors, flotation agents, and petroleum additives.

While the invention has been described with particular reference to specific embodiments, it is to be understood that it is not to be limited thereto but is to be construed broadly and restricted solely by the scope of the appended claims.

I claim:

1. A method of preparing a chloroacetylurea of the general formula

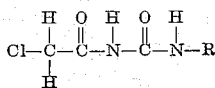

wherein R is a member of the group consisting of hydrogen, alkyl, and aryl radicals, which includes the step of reacting together a urea of the formula

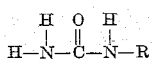

in which R has the meaning designated above, thionyl chloride, and a member of the group consisting of monochloroacetic acid and an alkali metal salt of monochloroacetic acid to form a chloroacetylurea of the above formula and gaseous by-products, and separating the former from the latter.

2. The method of claim 1 in which the reaction is carried out at a temperature within the range of from about 30° C. to 150° C.

3. The method of claim 1 in which the reaction is carried out in the presence of an inert diluent.

4. A method of preparing monochloroacetylurea which includes the step of reacting together monochloroacetic acid, thionyl chloride, and urea to form monochloroacetylurea.

5. A method of preparing 1-chloroacetyl-3-methylurea which includes the step of reacting together monochloroacetic acid, thionyl chloride, and methylurea to form 1-chloroacetyl-3-methylurea.

6. A method of preparing 1-chloroacetyl-3-phenylurea which includes the step of reacting together monochloroacetic acid, thionyl chloride, and phenylurea to form 1-chloroacetyl-3-phenylurea.

7. A method of preparing a chloroacetylurea of the general formula

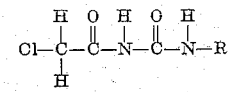

wherein R is a member of the group consisting of hydrogen, alkyl, and aryl radicals, which includes the step of reacting together a urea of the formula

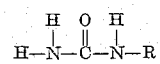

in which R has the meaning designated above, thionyl chloride, and a member of the group consisting of monochloroacetic acid and an alkali metal salt of monochloroacetic acid, to form a chloroacetylurea of the above formula and gaseous by-products, and separating the former from the latter, in which the reaction is carried out at a temperature within the range of from 30° C. to 150° C. and the reactants are present in substantially molecular proportions.

ERICK I. HOEGBERG.

REFERENCES CITED

The following references are of record in the file of this patent:

UNITED STATES PATENTS

| Number | Name | Date |
|---|---|---|
| 2,135,064 | Whitmore | Nov. 1, 1938 |

FOREIGN PATENTS

| Number | Country | Date |
|---|---|---|
| 144,431 | Germany | Sept. 14, 1903 |

OTHER REFERENCES

Andreasch, "Monatshefte fur chemie," vol. 43 (1922), page 487.